(12) United States Patent
Amit et al.

(10) Patent No.: US 7,703,131 B1
(45) Date of Patent: Apr. 20, 2010

(54) SECURED DISTRIBUTED IMPERSONATION

(75) Inventors: Neta Amit, Haifa (IL); Alexander Frank, Ramat-Gan (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/516,402

(22) Filed: Mar. 1, 2000

(51) Int. Cl.
G06F 7/04 (2006.01)
G06F 15/16 (2006.01)

(52) U.S. Cl. .................... 726/8; 726/6; 709/201
(58) Field of Classification Search ......... 709/225–229, 709/201; 713/201; 726/6, 8
See application file for complete search history.

(56) References Cited

U.S. PATENT DOCUMENTS

| | | | |
|---|---|---|---|
| 5,613,012 A * | 3/1997 | Hoffman et al. | 382/115 |
| 5,845,082 A * | 12/1998 | Murakami | 709/226 |
| 5,916,307 A | 6/1999 | Piskiel et al. | |
| 5,918,228 A * | 6/1999 | Rich et al. | 707/10 |
| 5,974,566 A * | 10/1999 | Ault et al. | 714/15 |
| 5,999,711 A * | 12/1999 | Misra et al. | 713/201 |
| 6,006,018 A * | 12/1999 | Burnett et al. | 709/219 |
| 6,014,666 A * | 1/2000 | Helland et al. | 707/9 |
| 6,055,637 A * | 4/2000 | Hudson et al. | 726/20 |
| 6,058,389 A | 5/2000 | Chandra et al. | |
| 6,073,174 A * | 6/2000 | Montgomerie et al. | 709/224 |
| 6,081,900 A * | 6/2000 | Subramaniam et al. | 713/201 |
| 6,094,694 A | 7/2000 | Hickson et al. | |
| 6,141,423 A * | 10/2000 | Fischer | 380/286 |
| 6,205,498 B1 | 3/2001 | Habusha et al. | |
| 6,282,565 B1 | 8/2001 | Shaw et al. | |
| 6,338,064 B1 * | 1/2002 | Ault et al. | 707/9 |
| 6,374,402 B1 * | 4/2002 | Schmeidler et al. | 717/167 |
| 6,397,352 B1 | 5/2002 | Chandrasekaran et al. | |
| 6,401,136 B1 | 6/2002 | Britton et al. | |
| 6,405,315 B1 * | 6/2002 | Burns et al. | 713/190 |
| 6,418,419 B1 | 7/2002 | Nieboer et al. | |
| 6,438,690 B1 * | 8/2002 | Patel et al. | 713/156 |
| 6,453,354 B1 * | 9/2002 | Jiang et al. | 709/229 |
| 6,510,523 B1 * | 1/2003 | Perlman et al. | 713/201 |
| 6,523,065 B1 * | 2/2003 | Combs et al. | 709/226 |
| 6,529,932 B1 | 3/2003 | Dadiomov et al. | |
| 6,549,932 B1 * | 4/2003 | McNally et al. | 709/202 |
| 6,601,171 B1 * | 7/2003 | Carter et al. | 713/175 |
| 6,643,661 B2 * | 11/2003 | Polizzi et al. | 707/100 |
| 6,742,114 B1 * | 5/2004 | Carter et al. | 713/156 |
| 7,451,147 B1 * | 11/2008 | Kao et al. | 707/9 |
| 7,478,050 B1 * | 1/2009 | Togawa et al. | 705/8 |

(Continued)

OTHER PUBLICATIONS

Kohl et al., *Request for Comments RFC1510*—"The Kerberos Network Authentication Service" (Sep. 1993).

(Continued)

*Primary Examiner*—Emmanuel L Moise
*Assistant Examiner*—Michael Pyzocha
(74) *Attorney, Agent, or Firm*—Lee & Hayes, PLLC (57) ABSTRACT

The invention relates to secured distributed impersonation, for use within systems such as batch system and batch message transaction systems. In one embodiment, a method includes sending a request for credentials of a network account from an originating account associated with an unpublished object to a dispatch associated with a published object. In one embodiment, both the unpublished and the published objects can each be a message queue. The dispatch authenticates the originating account. Upon successful authentication, the network account access emblem is sent to the originating account—that is, the originating account receives the requested credentials, which facilitate the ability to impersonate into the network account.

20 Claims, 3 Drawing Sheets

U.S. PATENT DOCUMENTS

2005/0015775 A1* 1/2005 Russell et al. ............... 719/315

OTHER PUBLICATIONS

Neuman et al., "*Kerberos: An Authentication Service For Computer Networks*," USC/ISI Technical Report No. ISI/RS-94-39; Copyright 1994 Institute of Electrical and Electronics Engineers, IEEE Communications Magazine, vol. 32, No. 9, pp. 33-38 (Sep. 1994).

"*Windows 2000 Kerberos Authentication*", Microsoft Windows NT Server, White Paper, Copyright 1999, Microsoft Corporation.

Hu, "*DCE Security Programming*", Copyright 1995, O'Reilly & Associates, Inc., pp. 1-50, 226-237.

* cited by examiner

SECURED DISTRIBUTED IMPERSONATION

FIELD OF THE INVENTION

This invention relates generally to batch systems, such as message transaction batch systems, and more particularly to secured distributed impersonation within such systems.

BACKGROUND OF THE INVENTION

When organizations need to have large-scale computer systems that hold mission critical information, such as purchase orders, financial information, etc., they usually resort to message transaction systems. Message transaction systems ensure that data is not lost if the system crashes, and also that data is not duplicated—such as ensuring that two copies of the same purchase order are not processed, etc. A transaction is an activity or a request, such as an order, a purchase, a change, or an addition to a database of information. Transactions usually update one or more files on a non-volatile storage such as a hard disk drive, and thus can serve as both an audit trail and a history for future analyses. A transaction can include one or more messages. A transaction is considered committed when all the messages of the transaction have been received and processed.

Message transaction systems can be batch systems. A batch is a set of requests that are processed together, often long after the requests have been submitted. For example, batch systems can execute the batches during non-peak periods, such as overnight, when usually requests are not being received as frequently. Typically, each batch is a sequence of transactions, and is executed sequentially, one transaction at a time. A batch system in the context of a message transaction system can be an off-line system, where transactions are collected throughout the day, for example, and then processed at night.

Batch systems can run in secure distributed environments, where there can be literally thousands of computers over which the batch "jobs" (viz., units of work running on the computer) are executed. Frequently, each computer has only limited access rights within the system, and usually does not have global rights to the entire system. This is problematic because a given computer which is given a particular transaction to commit (e.g., a particular batch job to execute) may not have all the access rights necessary to execute the job. That is, the dispatch computer, which is responsible for parceling out transactions for performance by the computers within the system, generally gives transactions to the computers as they become available, so that the computing resources within the system are leveraged. But the dispatch computer may parcel a job out to a computer that does not have adequate access privileges to execute the job.

Within the prior art, there are different ways to solve this problem, all of which are disadvantageous. First, a technician with sufficient privileges can manually start all the computers—that is, log onto all the computers—before the batch processing starts, such that all the computers are "live," and therefore all resources are open and available to every computer. However, this is not practical, and can also pose a security risk, inasmuch as when the processing takes place, the system becomes completely open and thus unsecure.

Second, passwords for various accounts can be stored locally on the computers. Thus, when a computer needs access to a resource that it does not have privileges for, the computer can use the passwords it has at its disposal to properly access the resource. This, too, however, is a security risk, since a hacker breaking into the system may be able to obtain all the passwords for the entire system from a single compromised computer. Furthermore, there is a maintenance problem with this approach—passwords frequently change, such that the password stores throughout the system must be updated.

For these and other reasons, therefore, there is a need for the present invention.

SUMMARY OF THE INVENTION

The invention relates to secured distributed impersonation, such as can be used within batch systems, such as batch message transaction systems. In one embodiment, a method includes sending a request for network account credentials from an originating account associated with an unpublished object to a dispatch associated with a published object. In one embodiment, both the unpublished and the published objects can each be a message queue. The request is sent specifically to the published object, and identifies the unpublished object. The originating account can be at a local computer, for example, within a system of which the dispatch is also a part. The network account credentials can be, for example, the account credentials that the originating account needs to properly perform a job that has been assigned to it.

The dispatch authenticates the originating account. Upon successful authentication, the network account credentials are sent to the originating account. In one embodiment, these account credentials are included in data that is generically referred to herein in a non-restrictive and non-limited manner as an emblem, which can in one embodiment be a secure manner by which the credentials are transmitted. For example, the emblem can be a token, as known within the art. The emblem is specifically sent to the unpublished object associated within the originating account, as identified in the initial request therefrom. The network account for which the originating account requested credentials can be a batch account of the dispatch itself, in one embodiment, while in another embodiment it can be an agent account onto which the dispatch proxy logs. In either case the dispatch has the network account remoted back to the originating account. Furthermore, in another embodiment, the network account can be any of a number of agent accounts, such that any of the agent accounts can be remoted back to the originating account as the network account. Thus, the request for a network account can be a request for the credentials of a particular agent account, or for the credentials of any of a group of agent accounts; moreover, in one embodiment, the dispatch determines which agent account to have credentials therefore sent back to the originating account. Thus, the method allows for the originating account to "impersonate" a network account to perform the tasks it needs to, for example, in a secured manner.

Embodiments of the invention therefore provide for advantages not found within the prior art. Batch systems where the computers constituting the system have varying access privileges can nevertheless perform batch processing securely. Rather than opening up the entire system as in the prior art, or storing passwords locally, or having a technician manually log onto all the computers within the system, computers can impersonate other computers as needed. The system remains secure. Passwords do not need to be stored local. And, the process is automated.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
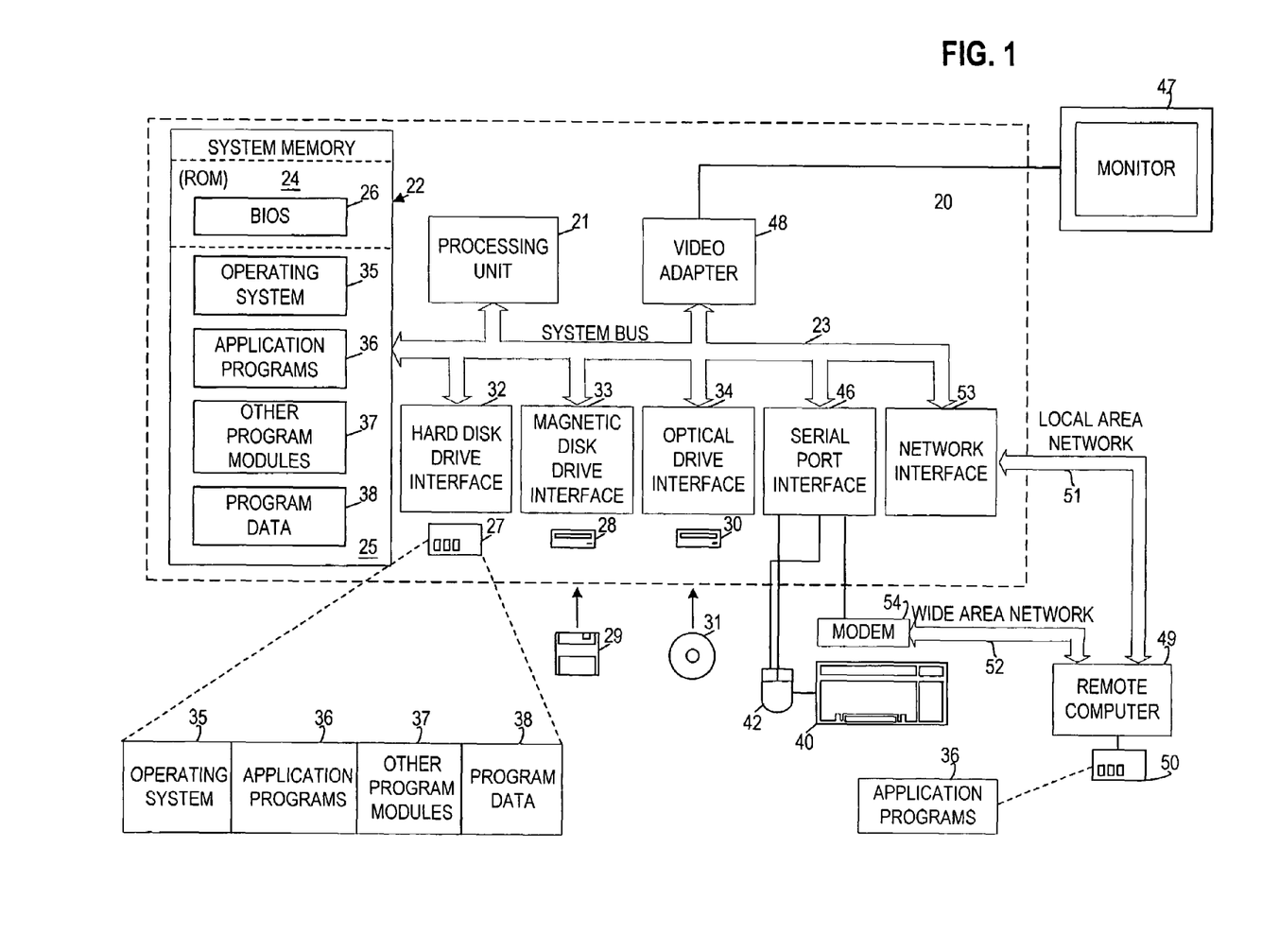
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general-purpose computing-device in the form of a computer, including a processing unit 21, a system memory 22, and a system bus 23 that operatively couples various system components including the system memory to the processing unit 21. There may be only one or there may be more than one processing unit 21, such that the processor of computer comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM). A basic input/output system (BIOS) 26, containing the basic routines that help to transfer information between elements within the computer, such as during start-up, is stored in ROM 24. The computer further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM, including an operating system 35, one or more application programs 36, other program modules 37, and program data 38. A user may enter commands and information into the personal computer through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer may operate in a networked environment using logical connections to one or more remote computers, such as remote computer 49. These logical connections are achieved by a communication device coupled to or a part of the computer; the invention is not limited to a particular type of communications device. The remote computer 49 may be another computer, a server, a router, a network PC, a client, a peer device or other common network node, and typically includes many or all of the elements described above relative to the computer, although only a memory storage device has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It is appreciated that the network connections shown are exemplary and other means of and communications devices for establishing a communications link between the computers may be used.

Systems

In this section of the detailed description, systems according to varying embodiments of the invention are described. The systems are described in conjunction with FIG. 2, which is a diagram of a system according to an embodiment of the invention. The system can in one embodiment be a batch system, such as a batch message transaction system, although the invention is not so limited, as can be appreciated by those of ordinary skill within the art.

Figure 2:
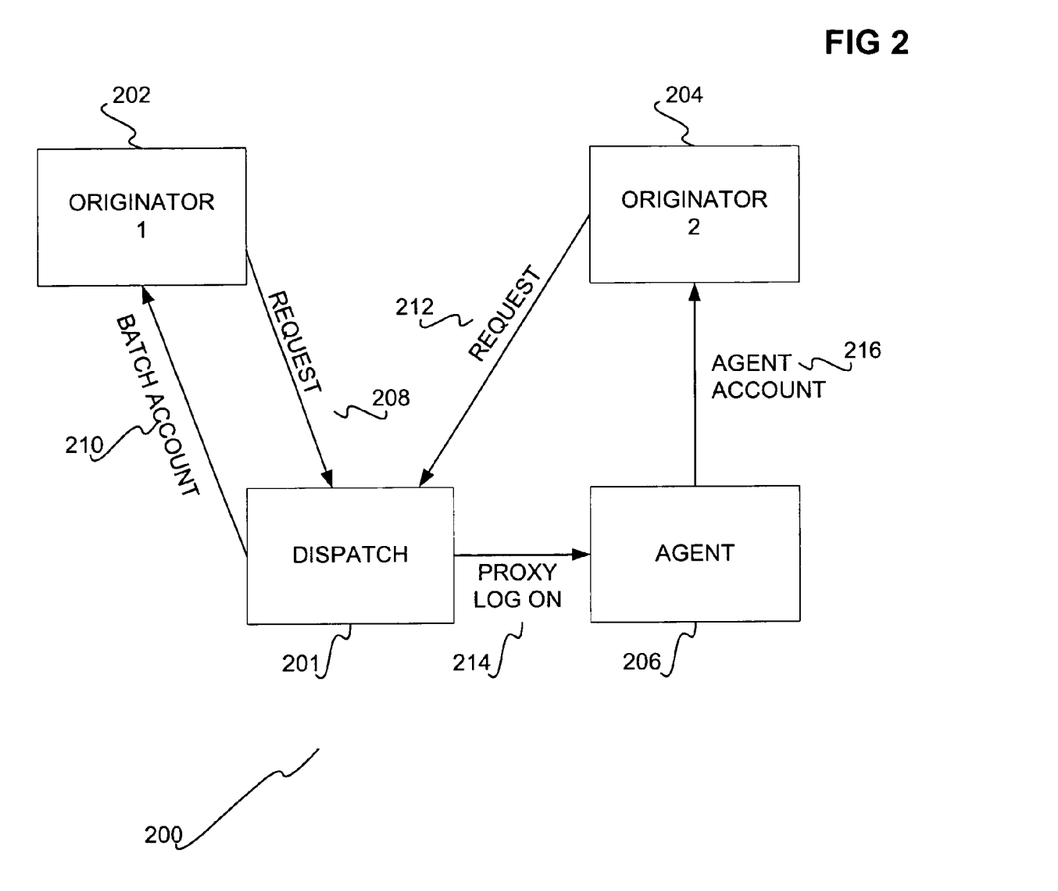
FIG. 2 is a diagram of a system according to an embodiment of the invention; and, FIG. 3 is a flowchart of a method according to an embodiment of the invention.

Referring now to FIG. 2, the system 200 includes a dispatch 201, a first originator 202, a second originator 204, and an agent 206. Each of these can in one embodiment be a computer, such as that described in the preceding section of the detailed description. Alternatively, each of these can be a separate software program, or a separate task and/or thread, running on one or more computers. The invention is not so limited.

Each of the originators 202 and 204, as well as the agent 206, can in one embodiment be likened to and/or have a corresponding account. An account generally, non-restrictively, and in a non-limited manner refers to herein as an established relationship between a user and a computer, network or information service. Such accounts can include network accounts, local accounts, and machine accounts, as can be appreciated by those of ordinary skill within the art. For example, local accounts can include user accounts, such as administrator accounts, user accounts, guest accounts, etc. Gaining access to such accounts may require a username and password, and each account has a set of permissions as to the resources it is able to access. In general, as can be appreciated by those of ordinary skill within the art, each account has an identification (ID) corresponding to the owner.

For the system 200 of FIG. 2, there typically is more than three network accounts and/or computers, however, only three are specifically shown for illustrative clarity purposes. The dispatch 201 also has a corresponding account, which is referred to as the batch account herein. The accounts for the originators 202 and 204 are referred to as originating accounts, while the account for the agent 206 is referred to as the agent account. At least the batch account for the dispatch 201, and the agent account for the agent 206, are network accounts, which means that they have privileges to resources across the network. The credentials for any account refer to, in a non-restrictive and a non-limited manner, the identifying information that enables the account to have its access privileges. For example, the credentials for a network account allow the network account its privileges to access resources across the network, in some defined manner.

The agent account 206, is capable of being proxy logged onto, and of being remoted to another account. Proxy logon refers to the process by which a first account logs onto a second account in a secured manner without having to present a secret identifier which belongs to the second account, such as a password. Remoting refers to the transfer of a first account to a second account, such that the second account is able to use the first account and its permissions as if it were the first account. (Accounts are transferred in one embodiment by transfer of their credentials.)

The dispatch 201 generally determines what pending tasks and/or jobs should be done next and assigns the available resources, such as the originators 202 and 204, and the agent 206 to accomplish it. In the system 200 of FIG. 2, each of the originators 202 and 204 has been assigned a batch job to execute, for which it does not have adequate access to resources to complete. Therefore, each of the originators 202 and 204 must ask the dispatch 201 for one or more account credentials so that it can complete its assigned job. Specifically, they request credentials of the network accounts for access to resources across the system 200 that they need to complete their jobs. Two specific cases are examined.

The first case involves the first originator 202. The first originator 202—viz., such as its corresponding originating account—sends a request 208 for network account credentials that will enable the first originator 202 to complete its assigned batch job. In response, the dispatch 201 fields the request 208 and returns the credentials of its batch account, as represented by arrow 210 in FIG. 2. Thus, the batch account is "returned" as the credentials of the network account requested. The batch account credentials enable the originator 202 to complete its assigned batch job. Upon receipt of the batch account credentials, the originator 202 is able to impersonate the batch account—that is, it is able to impersonate the dispatch 201—so that it can access resources which the batch account has permission to access.

The second case involves the second originator 204. The second originator 204—viz., such as its corresponding originating account—sends a request 212 for network account credentials, again such as network account credentials that will enable the second originator 204 to complete its assigned batch job. In response, the dispatch 201 fields the request and proxy logs onto the agent account for the agent 206, as represented by the arrow 214, and has the agent account remoted back to the second originator 204, as represented by the arrow 216. That is, the agent account has its credentials returned as the network account credentials requested. The agent account enables the originator 204 to complete its assigned batch job. Upon receipt of the agent account, the originator 204 is able to impersonate the agent account—viz., it is able to impersonate the agent 206—so that it can access resources which the agent account has permission to access. (It is noted that in one embodiment, the proxy log-on as represented by the arrow 214 is performed completely within the dispatch 201; it is illustrated separate within FIG. 2 for illustrative purposes only in this case.)

In one embodiment, when the dispatch 201 fields a request, such as the request 208 or the request 212, it first authenticates the originating account from which the request came. If the authentication fails—that is, if the dispatch 201 is not able to authenticate the originating account from which the request was sent—then credentials for a network account are not returned to the originating account. This provides a first level of security. Furthermore, the initial request may be sent from the originating account in an unencrypted manner, while all subsequent communication may be sent in an encrypted manner, such as by message transaction encryption available within message transaction systems, by public/private-key encryption, etc., as can be appreciated by those of ordinary skill within the art. This provides a second level of security.

In one embodiment, at least the dispatch 201 and each of the originators 202 and 204 have associated therewith an object that is capable of storing data, which can be referred to as a "payload" of data, where payload refers to the data-carrying capacity of a structure. In varying embodiments, the objects can be files, message queues, etc.; the invention is not so limited. The objects for the originators 202 and 204 are unpublished objects. They are not globally known, and can be accessed by other accounts that know theirs identities, e.g. b/c they were previously informed of their identities. It is noted that an object in one embodiment is only read-accessible by its owner.

The object for the dispatch 201 is the mechanism by which, in one embodiment, the dispatch 201 is able to receive requests such as the requests 208 and 212. Therefore, the object for the dispatch 201 is desirably a published object, so that every account within the system 200 can send a request thereto, without having to be previously informed of the object's identity. The objects for the originators 202 and 204 are the mechanisms by which, in one embodiment, the originators 202 and 204 receive account credentials satisfying their requests for network account credentials. Such requests desirably identify the objects, since they are not published, so that the dispatch 201 is able to know where to send the requested-for network account credentials.

In one embodiment, the network account credentials sent back to the originators 202 and 204, such as the batch account in the case of the originator 202, and the agent account in the case of the originator 204, are represented as emblems. Emblems are generally referred to herein as objects in which network account credentials can be transmitted securely, and include both the objects as well as the credentials themselves. That is, the access privileges represented by the credentials of network accounts are securely included in data that are generically referred to herein in a non-restrictive and non-limited manner as emblems. In one embodiment, the emblems are expirable, such that they are only valid for a limited period of time, to add another level of security within the system 200. In such an embodiment, when the emblem is about to expire, it is renewed with a renewing authority—for example, the dispatch 201, although the invention is not so limited—so that the originator that is the holder of the emblem can continue to access system resources as allowed by the network access credentials encased within the emblem. The manner by which emblems are renewed is not limited by the invention. In one embodiment, the emblems are transparently renewed, while in a different embodiment, the emblems must be specifically renewed by their holders prior to expiration.

In the description of the system 200 of FIG. 2, two cases were specifically described as representative of embodiments of the invention: an originating account making a request for the credentials of a network account and receiving in response the batch account access emblem of the dispatch that includes the network account credentials for the dispatch; and, an originating account making a request for network account credentials and receiving in response the access emblem of an agent account, where the access emblem includes the network account credentials for the agent account, and where the agent was proxy logged onto by the dispatch so that its agent account could be remoted back to the originating account. It is noted, however, that each of these cases is representative of embodiments of the invention, and do not represent limitations thereon.

For example, in another embodiment, any number and any type of account can be used. Proxy logon can be used to allow network accounts to log onto other network accounts. Furthermore, any type of account can be used as the originating account, such as a local account, a machine account, or a user account. In such embodiments of the invention, the "any number" and "any type" of account capabilities allow for any-account-to-any-account impersonation capability, as can be appreciated by those of ordinary skill within the art.

As another example, in other embodiments of the invention, the credentials requested for by the originating account can be for a type of agent account, such that any number of agent accounts have credentials satisfying the request. In such an instance, the dispatch, for example, can determine which agent account has its credentials sent back to the originating account. In other embodiments, the credentials requested for by the originating account can be for a particular agent account, such that only the credentials for this agent account can satisfy the originating account's request.

Methods

In this section of the detailed description, methods according to varying embodiments of the invention are described. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 3:
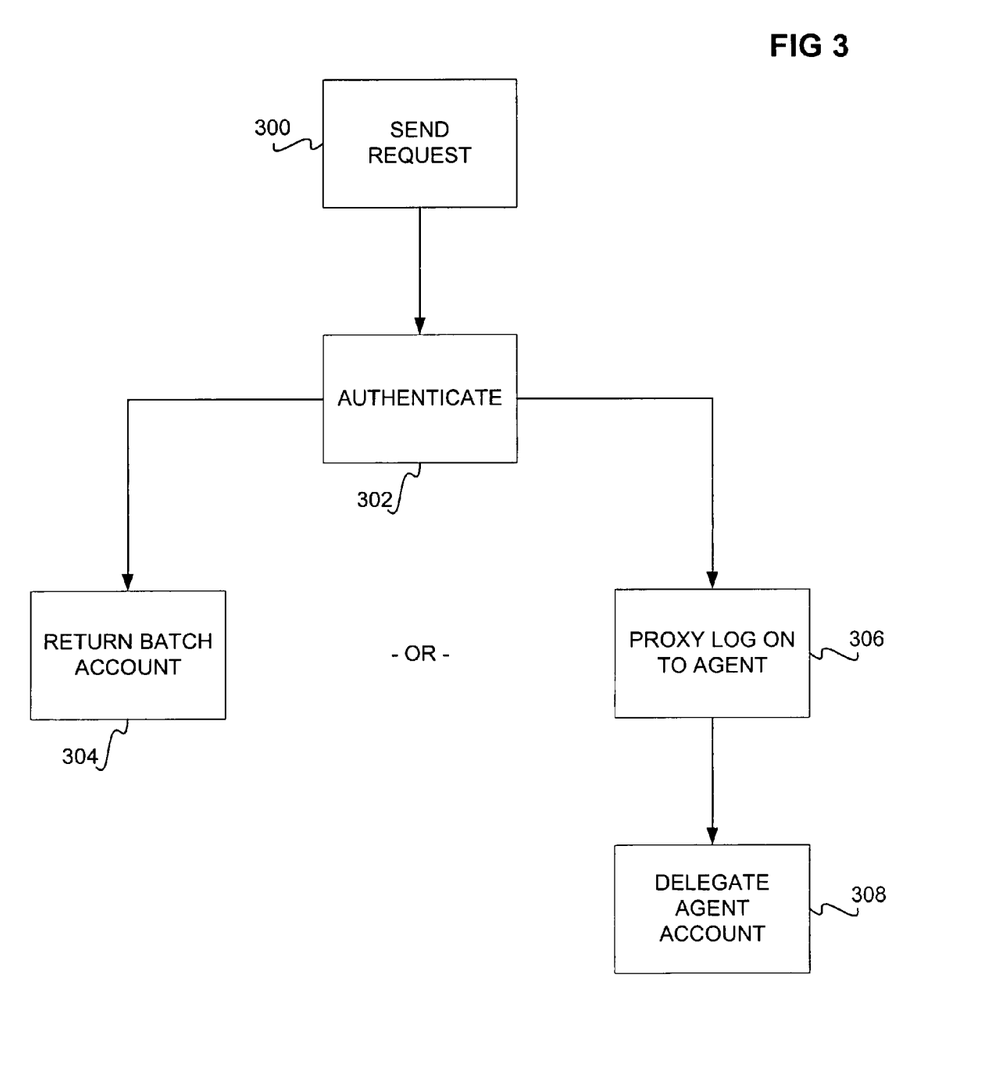

Referring to FIG. 3, a flowchart of a method according to an embodiment of the invention is shown. In 300, a request is sent for network account credentials from an originating account to a dispatch. In one embodiment, the originating account is associated with an unpublished object, as has been described, and the dispatch is associated with a published object, as has also been described. In such an embodiment, the request is sent to the published object, and includes identification of the unpublished object.

In 302, the dispatch authenticates the originating account. Upon authentication, a network account access emblem is sent back to the originating account as requested, where the emblem includes the credentials for a network account. In one embodiment, the access emblem of a network account is sent back to the unpublished object associated with the originating account, having the identification as initially included in the request.

This process of returning network account credentials to an originating account can be accomplished in specific embodiments by performance of 304, or by performance of 306 and 308. In 304, a batch account access emblem of the dispatch is returned to the originating account and includes its credentials. Conversely, in 306, the dispatch proxy logs onto an agent account, packs and sends its credentials to the originating account (by means of an emblem), such that in 308 the agent account access emblem is remoted to the originating account, where the emblem includes the network account credentials. It is noted that the method of FIG. 3 can be implemented in conjunction with embodiments of the invention as described in the previous section of the detailed description. Therefore, for example, the initial request sent in 300 can be unencrypted, while successive communications, such as those performed in 304, or 306 and 308, should be encrypted, as has been described. As another example, each of the published object and the unpublished object can be a message queue, a file, etc., as has been described. Furthermore, where an emblem is sent back to the originating account, the emblem can be expirable, such that in one embodiment the method also includes determining whether the emblem is about to expire, and upon so determining, renewing the emblem with a renewing authority, such as the dispatch, as has been described. Finally, the originating account can be one or more of a local account, a machine account, and a user account.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method comprising:
    assigning a job by a dispatch to an originating account, the originating account not having adequate resources to accomplish the job;
    sending a request for network account credentials from the originating account to the dispatch that is associated with a published object, the network account credentials include the resources to complete the job, the request directed to the published object includes an identification of an unpublished object associated with the originating account, the published object is accessible by an account without prior identification of the published object and the unpublished object is accessible by the account when the account is previously informed about the identification of the unpublished object;
    authenticating the originating account at the dispatch;
    determining the network account credentials to send to the originating account, the network account credentials facilitate the originating account to impersonate a network account of the dispatch to complete the job in a secured manner; and
    upon authenticating the originating account, sending an emblem that includes the published object and the network account credentials from the dispatch to the originating account.

2. The method of claim 1, wherein the request is unencrypted, and the emblem is encrypted.

3. The method of claim 1, wherein each of the published object and the unpublished object comprises a message queue.

4. The method of claim 1, wherein each of the published object and the unpublished object comprises a file.

5. The method of claim 1, wherein the emblem comprises a token that includes the network account credentials.

6. The method of claim 1, wherein the network account for which the emblem is sent from the dispatch to the originating account comprises a batch account of the dispatch.

7. The method of claim 1, wherein sending the emblem for the network account to the originating account comprises remoting a batch account to the originating account, such that the emblem comprises the emblem for the batch account.

8. The method of claim 1, wherein the network account for which the emblem is sent from the dispatch to the originating account comprises an agent account of an agent.

9. The method of claim 1, wherein sending the emblem for the network account to the originating account further comprises:
    determining an agent that contains the network account credentials to be sent to the originating account;
    proxy logging on to the agent; and,
    remoting an agent account to the originating account to complete the assigned job upon proxy log on to the agent, such that the emblem comprises the emblem for the agent account.

10. The method of claim 1, wherein the emblem is expirable, such that the method further comprises determining whether the emblem is about to expire, and upon so determining, renewing the emblem with a renewing authority.

11. The method of claim 1, wherein the dispatch is a device within a network that sends the network account credentials to the originating account.

12. A computer-readable storage media having computer-readable instructions thereon which, when executed by a computer, implement a method comprising:
    assigning a job by a dispatch to an originating account, the originating account not having adequate resources to accomplish the job;
    sending a request for network account credentials from the originating account to the dispatch that is associated with a published object, the network account credentials include the resources to complete the job, the request directed to the published object includes an identification of an unpublished object associated with the originating account;
    authenticating the originating account at the dispatch;
    determining the network account credentials to send to the originating account; and
    upon authenticating the originating account, sending an emblem that includes the published object and the network account credentials from the dispatch to the originating account.

13. The computer-readable storage media of claim 12, wherein the assigning the job includes determining by the dispatch of what pending tasks or jobs should be performed first.

14. The computer-readable storage media of claim 12, wherein the published object that is associated with the dispatch is accessible without prior identification.

15. The computer-readable storage media of claim 12, wherein the published object comprises one of: a file, and a message queue.

16. The computer-readable storage media of claim 12 further includes proxy logging to an agent account to complete the job.

17. A computing device comprising:
- a memory;
- a processor, coupled to the memory, configured to implement a method comprising:
- assigning a job by a dispatch to an originating account, the originating account not having adequate resources to accomplish the job;
- sending a request for network account credentials from the originating account to the dispatch that is associated with a published object, the network account credentials include the resources to complete the job, the request directed to the published object includes an identification of an unpublished object associated with the originating account;
- authenticating the originating account at the dispatch;
- determining the network account credentials to send to the originating account; and
- upon authenticating the originating account, sending an emblem that includes the published object and the network account credentials from the dispatch to the originating account.

18. The computer computing device of claim 17, wherein the unpublished object associated with the originating account is accessible by an account when the account is previously informed of the identification of the unpublished object.

19. The computer computing device of claim 17, wherein the network account credentials include the network account credentials of an agent account, which is used to complete the job.

20. The computer computing device of claim 17, wherein the agent account is determined by the dispatch.

* * * * *